United States Patent [19]

Hayden

[11] Patent Number: 4,550,521

[45] Date of Patent: Nov. 5, 1985

[54] LURE HAVING BAIT STORAGE COMPARTMENT

[76] Inventor: Martin P. Hayden, 9951 53rd La., N., Pinellas Park, Fla. 33565

[21] Appl. No.: 606,513

[22] Filed: May 3, 1984

[51] Int. Cl.⁴ ............................................. A01K 97/04
[52] U.S. Cl. ...................................... 43/41; 43/42.06; 43/44.99
[58] Field of Search ..................... 43/41, 44.99, 42.41, 43/42.06

[56] References Cited

U.S. PATENT DOCUMENTS

| | | | |
|---|---|---|---|
| 2,008,004 | 7/1935 | Catarau | 43/41 |
| 3,434,230 | 3/1969 | Littlefield | 43/42.06 |
| 3,688,430 | 9/1972 | Balch | 43/42.06 |
| 4,044,490 | 8/1977 | Young | 43/44.99 |
| 4,074,455 | 2/1978 | Williams | 43/42.06 |
| 4,205,476 | 6/1980 | Hsu | 43/42.06 |
| 4,267,658 | 5/1981 | Brown | 43/42.06 |
| 4,317,305 | 3/1982 | Firmin | 43/42.24 |

*Primary Examiner*—Gene P. Crosby
*Attorney, Agent, or Firm*—Ronald E. Smith

[57] ABSTRACT

A fishing lure. The lure includes a head, body and tail giving the general appearance of a fish. The body is flexible and hollow, and defines a compartment into which bait is placed. A plurality of small openings are formed on the upper and rearward quarter of the body in a region where such body tapers downwardly to join the tail. A flap member at the forward portion of the body provides the closure means for the compartment. The operative part of a hook extends through one of the small openings so that the barb of the hook is positioned in vertically spaced relation above the body, rearwardly of the flap. String-shaped pieces of bait extend through the small openings to attract fish.

3 Claims, 2 Drawing Figures

U.S. Patent
Nov. 5, 1985
4,550,521
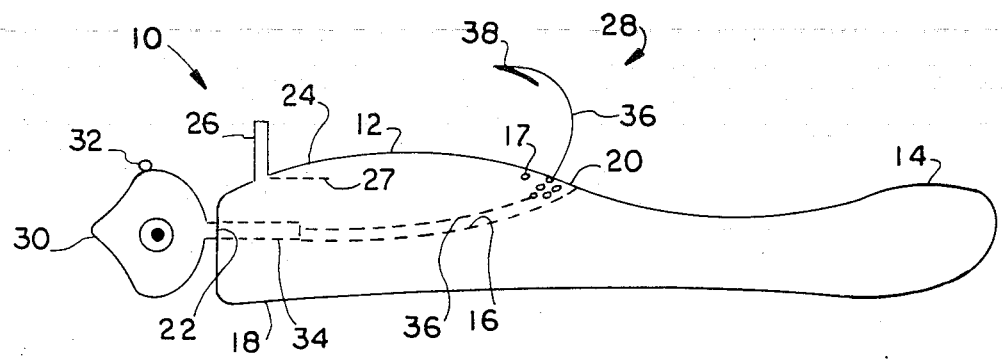
FIG_1
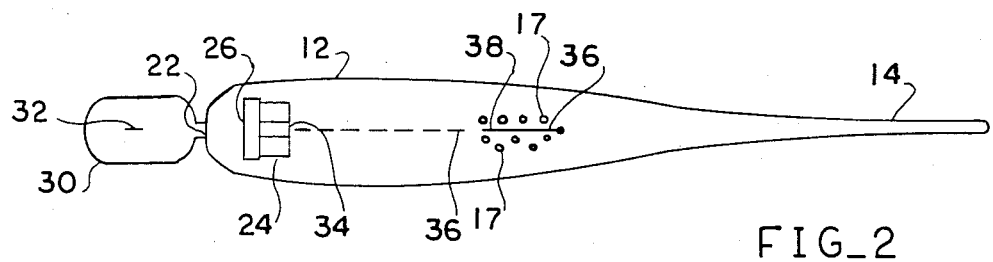
FIG_2

LURE HAVING BAIT STORAGE COMPARTMENT

BACKGROUND OF THE INVENTION

1. Field of the Invention

This invention relates, generally, to lures of the type having utility in a fishing context, and more specifically relates to hollow lures of the type adapted to have bait stored therein.

2. Description of the Prior Art

A search of U.S. patents that was conducted prior to the filing of this disclosure located the following U.S. Pat. Nos.: 2,149,054 (1939); 2,938,293 (1960); 3,688,430 (1972); 3,861,075 (1975); 4,196,884 (1980); 4,205,476 (1980) and 4,317,305 (1982). U.S. Pat. No. 4,205,476 shows a rigid lure having a compartment for the storage of bait therein. Access into the compartment is gained by swinging the tail portion of the lure about a hinge. A plurality of hooks are provided both above and below the lure, which hooks are secured to the lure by mounting means formed on the body of the lure.

The lures of the prior art that are provided with bait-carrying pouches were developed because bait falls off hooks easily. However, the lures that have been developed nevertheless do not represent the final word in hollow, bait-carrying lures for several reasons. They are characterized by moving parts such as hinges, for example, which not only deteriorate rapidly in water, but which are also expensive to manufacture. Moreover, the known lures in the field of this invention are prone to become snagged on grass or other objects at the bottom of the region being fished. There is a need for a bait-carrying lure that is economical to manufacture, which is designed so as not to be snag-prone, and which is durable and long-lasting even under conditions of extensive use.

SUMMARY OF THE INVENTION

The inventive lure is formed of a soft plastic material that is poured into a two piece mold. An insert in the mold produces a hollow cavity in the upper half of the body of the lure. Small openings are punched in the rearward top quarter of the body so that bait within the cavity may at least partially stream therefrom. The forward, upper end of the cavity is provided with a relatively large opening vis a vis the aforesaid small openings, and an upstanding, flexible flap is provided adjacent such large opening as a closure member. A conventional jig head hook is inserted into the cavity through a second large opening formed at the proximal end of the body portion of the lure and the barb of the hook passes through a preselected one of the small openings punched in the body of the lure. When so positioned, the barb-carrying portion of the hook is parallel to the longitudinal axis of the lure body, and the distal end of the barb is spaced rearwardly of the flap. A flat tail disposed in a vertical plane is integrally formed with and trails the body of the lure when it is in use.

It is therefore understood that an important object of this invention is to provide a lure that can carry bait in a pouch, to thereby solve a problem that has long been present in the fishing industry.

Another object is to provide a lure that can be used in conjunction with a conventional jig head hook so that no special attachments are needed to use the lure.

It is also an object of this invention to provide a lure having a bait storage compartment that has no moving parts and which is economical to manufacture and therefore affordable by the fishing public.

The invention accordingly comprises the combination of elements, features of construction, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a side elevational view of the novel lure;

FIG. 2 is a top plan view thereof.

DETAILED DESCRIPTION OF THE PREFERRED EMBODIMENT

Referring now to the drawings, it will there be seen that an embodiment that illustrates the inventive concept is designated by the reference numeral 10 as a whole. The lure includes a body 12 and an integrally formed tail 14 trailing therefrom. The tail 14 is flat and lies in a vertical plane when the lure is being drawn through the water. Thus, the tail 14 maintains the desired vertical orientation of the lure 10 at all times.

The upper half of the body 12 is hollow, as indicated by numeral 16, generally. Cavity 16 extends from the forwardmost end 18 of the body 12 to the rearwardmost end 20 thereof. A plurality of small openings 17 are formed in the upper and rearward quarter of the body of the lure. Two large openings are also provided in the body, both of which are in communication with cavity 16. Forward opening 22 lies in a vertical plane, and upper opening 24 is formed in a substantially horizontal plane. Upper opening 24 is closeable by flexible flap member 26. The closed position of flap 26 is indicated in phantom lines in FIG. 1, as at 27. It has been found, however, that bait stored in cavity 16 will remain therein even if flap 26 is not closed.

A jig head hook 28 is employed in connection with the lure of this invention. The jig head hook 28 is commercially available and includes a fish-like in appearance head portion 30, a mounting means 32 to which fishing line is tied, a boss means 34, and a hook memeber 36 having a barb 38, said hook being secured at its base in the boss means 34. The jig head hook provides the mounting means for the novel lure. The barb 38 is passed through forward opening 22 and a preselected rearward one of the apertures 17 so that it extends upwardly of the body 12 as depicted in FIG. 1, with the barb 38 pointing forwardly.

This positioning of the hook is important, because it prevents the hook from snagging on the bottom of the area being fished.

To load bait into the lure, a properly sized piece of bait is inserted into cavity 16 through large upper opening 24, and flap 26 is tucked in. The flap 26 may be left open, however, because it will tend to bend and overlie the opening 26, thereby substantially closing it, when the lure is pulled through water.

Small string-like pieces of bait will extend through the openings 17, trailing the lure. This insures that fish will be attracted by the lure. It has been found that fish are drawn to the lure of this invention to a greater degree than to conventional lures.

It will thus be seen that the objects set forth above, and those made apparent by the foregoing description, are efficiently attained, and since certain changes may be made in the above construction without departing from the scope of the invention, it is intended that all matters contained in the foregoing description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. A fishing lure, comprising, a jig head hook member, a lure means having a body and a tail integrally formed therewith, said lure means formed of a soft, flexible plastic, said jig head hook member including a head portion in the image of a fish head, a hook member having a barb and a straight shank, and a boss member that receives said shank, a hollow cavity formed in the upper half of said body, of sufficient dimension to receive a piece of bait therein, a plurality of small openings formed in the upper, rearward quadrant of said body, just forwardly of said tail, a first large opening formed in the proximal end of said body to receive said boss member into said cavity, a second large opening formed in an upper, horizontal wall of said body to admit said piece of bait into said cavity, said hook shank disposed within said cavity, mounted by said boss member to the head portion of said jig head hook member, said head portion being external to said cavity, and positioned forwardly thereof, the barb of said hook member disposed externally of said cavity, upwardly of the body of said lure means, said hook member extending through a preselected one of said small openings, whereby the lure means is mounted to a jig head hook member and the hook member is disposed out of snagging engagement to the floor of the area being fished, and whereby small string-like pieces of bait will trail from said small openings attendant drawing said lure means through water.

2. The lure of claim 1, further comprising a flexible, upstanding flap member disposed forwardly of and contiguous to said second large opening, said flap member providing a closure means when said flap member is tucked into closing relation to said second large opening.

3. The lure of claim 2, wherein said tail is flat and aligned in a vertical plane so that when said lure means is drawn through the water, the tail maintains the vertical orientation of said lure means to thereby simulate the appearance of a fish swimming through water.

* * * * *